United States Patent
Liang

(10) Patent No.: US 9,563,089 B2
(45) Date of Patent: Feb. 7, 2017

(54) LIQUID CRYSTAL DISPLAY, ARRAY SUBSTRATE IN IN-PLANE SWITCHING MODE AND MANUFACTURING METHOD THEREOF

(71) Applicants: Shanghai AVIC Optoelectronics Co., Ltd., Shanghai (CN); Tianma Micro-Electronics Co., Ltd., Shenzhen (CN)

(72) Inventor: Yanfeng Liang, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/245,983

(22) Filed: Apr. 4, 2014

(65) Prior Publication Data

US 2015/0036089 A1 Feb. 5, 2015

(30) Foreign Application Priority Data

Jul. 30, 2013 (CN) .......................... 2013 1 0326466

(51) Int. Cl.
*G02F 1/1343* (2006.01)
*G02F 1/139* (2006.01)
*G02F 1/1333* (2006.01)

(52) U.S. Cl.
CPC ..... *G02F 1/134363* (2013.01); *G02F 1/13439* (2013.01); *G02F 1/133345* (2013.01); *G02F 2001/134318* (2013.01)

(58) Field of Classification Search
CPC ............ G02F 1/13439; G02F 1/134363; G02F 1/133345; G02F 2001/134381; G02F 1/134372

USPC ................. 349/122, 138, 141, 187
See application file for complete search history.

(56) References Cited

U.S. PATENT DOCUMENTS

| | | | |
|---|---|---|---|
| 6,284,558 B1 * | 9/2001 | Sakamoto | G02F 1/136227 438/29 |
| 6,506,617 B1 | 1/2003 | Cheng | |
| 7,796,225 B2 | 9/2010 | Cho et al. | |
| 7,924,386 B2 * | 4/2011 | Lee | 349/141 |
| 2004/0114083 A1 * | 6/2004 | Do | G02F 1/134363 349/141 |
| 2009/0033813 A1 | 2/2009 | Fan Jiang et al. | |
| 2014/0085557 A1 * | 3/2014 | Kim | 349/43 |

FOREIGN PATENT DOCUMENTS

| | | |
|---|---|---|
| CN | 103698950 A | 4/2014 |
| JP | 2007034218 A | 2/2007 |

OTHER PUBLICATIONS

Office Action as issued in corresponding Chinese Application No. 201310326466.6, dated Jan. 25, 2016.

* cited by examiner

*Primary Examiner* — Dung Nguyen
(74) *Attorney, Agent, or Firm* — Alston & Bird LLP

(57) ABSTRACT

An array substrate comprises a substrate, a passivation layer on a surface of the substrate, a first organic film on a surface of the passivation layer and provided with a groove, a common electrode disposed on a surface of the first organic film outside the groove, and a pixel electrode disposed in the groove. A vertical projection of the common electrode on the surface of the passivation layer does not overlap with a vertical projection of the pixel electrode on the surface of the passivation layer.

11 Claims, 8 Drawing Sheets

--Prior Art--

--Prior Art--

--Prior Art--

--Prior Art—

--Prior Art--

--Prior Art--

--Prior Art—

--Prior Art--

LIQUID CRYSTAL DISPLAY, ARRAY SUBSTRATE IN IN-PLANE SWITCHING MODE AND MANUFACTURING METHOD THEREOF

CROSS-REFERENCES TO RELATED APPLICATIONS

This application claims the benefit of priority to Chinese Patent Application No. 201310326466.6, filed with the Chinese Patent Office on Jul. 30, 2013 and entitled "LIQUID CRYSTAL DISPLAY, ARRAY SUBSTRATE IN IN-PLANE SWITCHING MODE AND MANUFACTURING METHOD THEREOF", the content of which is incorporated herein by reference in its entirety.

FIELD OF THE INVENTION

The present invention relates to the field of display technologies, and in particular to a liquid crystal display, an array substrate in an in-plane switching mode and a manufacturing method thereof.

BACKGROUND OF THE INVENTION

Thin film transistor liquid crystal displays are developing more and more rapidly and have become mainstream flat panel displays. From the time they came out up to the present, multiple categories of thin film transistor liquid crystal displays have been developed, driving modes and display effects thereof are different, and each category has its own advantages. Among them, a thin film transistor liquid crystal display in an In-Plane Switching (IPS) mode (comprising an array substrate in the IPS mode) exhibits excellent display capability and effect with its unique structural characteristics and driving principle.

As shown in FIG. 1, which is a plane view of an array substrate in the IPS mode, specific gaps 7 for avoiding short-circuit faults are provided between a pixel electrode 1 and a common electrode 2 when seen from the normal direction of the surface of the array substrate.

FIGS. 2a-2c are section views of an array substrate along the line I-I' in FIG. 1 in continuous manufacturing steps thereof in the prior art. As shown in FIGS. 2a-2c, firstly, a first organic film 4 as shown in FIG. 2b is formed on the surface of a passivation layer 3 as shown in FIG. 2a, and then a strip-shaped pixel electrode 1 and a strip-shaped common electrode 2, which are arranged alternately as shown in FIG. 2c, are formed on the surface of the first organic film 4. Since the pixel electrode 1 and the common electrode 2 are arranged on the same plane of the array substrate, the aperture ratio of the array substrate is small and thus the light transmittance is low in the display process.

FIGS. 3a-3d are section views of an array substrate along the line I-I' in FIG. 1 in another series of continuous manufacturing steps in the prior art. As shown in FIGS. 3a-3d, firstly, a strip-shaped pixel electrode 1 as shown in FIG. 3b is formed on the surface of a passivation layer 3 as shown in FIG. 3a, and then a first organic film 4 as shown in FIG. 3c covering the pixel electrode 1 is formed, and a strip-shaped common electrode 2 as shown in FIG. 3d is formed on the surface of the first organic film 4. In the manufacturing method, the pixel electrode 1 and the common electrode 2 are arranged on different planes of the same array substrate, so the transmittance can be increased, but the pixel electrode 1 and the common electrode 2 are formed in different processes. According to the above manufacturing steps, when the common electrode 2 is formed, the pixel electrode 1 has already been covered by the first organic film 4, and the common electrode 2 cannot be formed with the position of the pixel electrode 1 as a reference, so an error may occur on the specific gaps between the pixel electrode 1 and the common electrode 2 to thereby result in low precision of overlapping of the pixel electrode 1 and the common electrode 2 with respective preset positions.

To sum up, currently there is no array substrate capable of simultaneously achieving a high transmittance and overcoming the defect of the low precision of overlapping of the pixel electrode and the common electrode with respective preset positions.

BRIEF SUMMARY OF THE INVENTION

Embodiments of the present invention provide a liquid crystal display, an array substrate in an in-plane switching mode and a manufacturing method thereof, to solve the problem in the prior art that the array substrate in the IPS mode is not able to simultaneously achieve high transmittance and a precision of overlapping of the pixel electrode and the common electrode with respective preset positions.

According to an embodiment, an array substrate in an in-plane switching mode comprises a substrate and a passivation layer disposed on a surface of the substrate, and further comprises: a first organic film disposed on a surface of the passivation layer and provided with a groove; and a common electrode disposed on a surface of the first organic film outside the groove and a pixel electrode disposed in the groove, wherein a vertical projection of the common electrode on the surface of the passivation layer does not overlap with a vertical projection of the pixel electrode on the surface of the passivation layer.

According to another embodiment, a liquid crystal display comprises the above-described array substrate and a color film substrate arranged to be opposite to the array substrate, where a liquid crystal layer is formed between the array substrate and the color film substrate.

According to yet another embodiment, a manufacturing method of an array substrate in an in-plane switching mode comprises: forming a first organic film on a surface of a passivation layer of the array substrate; removing a part of the first organic film by etching a region in which a preset position vertically projects on the first organic film, wherein the preset position satisfies: comprising a pixel electrode position and at least not comprising a region in which a common electrode position on a surface of the first organic film vertically projects on a surface where the pixel electrode position is located; and forming a pixel electrode at the pixel electrode position, and meanwhile forming a common electrode at the common electrode position on the surface of the first organic film.

Compared with the prior art, the technical solution of the present invention has the following beneficial effects:

Since the pixel electrode is disposed in the groove of the first organic film and the common electrode is disposed on the surface of the first organic film outside the groove, the pixel electrode and the common electrode can be arranged on different planes of the same array substrate and can also be formed at one time, to thereby both ensure the light transmittance of the array substrate and accurately control the specific gaps between the pixel electrode and the common electrode, thus increasing the precision of overlapping of the pixel electrode and the common electrode with respective preset positions.

DETAILED DESCRIPTION OF THE INVENTION

In order to solve the problem in the prior art that the array substrate in the IPS mode cannot simultaneously achieve the high transmittance and increase the precision of overlapping of the pixel electrode and the common electrode with respective preset positions, the inventor provides, through research, a liquid crystal display, an array substrate in an in-plane switching mode and a manufacturing method thereof. In the technical solution, since the pixel electrode is disposed in the groove of the first organic film and the common electrode is disposed on the surface of the first organic film outside the groove, the pixel electrode and the common electrode can be arranged on different planes of the same array substrate and can also be formed at one time, to thereby both ensure the light transmittance of the array substrate and accurately control the specific gaps between the pixel electrode and the common electrode, thus increasing the precision of overlapping of the pixel electrode and the common electrode with respective preset positions.

In order to make the above objects, features and advantages of the present invention become more obvious and understandable, particular embodiments of the present invention will be described below in details in conjunction with the drawings.

Specific details are explained in the following description so as to fully understand the present invention. However, the present invention can also be implemented in other ways different from those described herein, and similar extensions can be made by those skilled in the art without departing from the conception of the present invention. Therefore the present invention is not limited to the particular implementation ways disclosed below.

Figure 1:
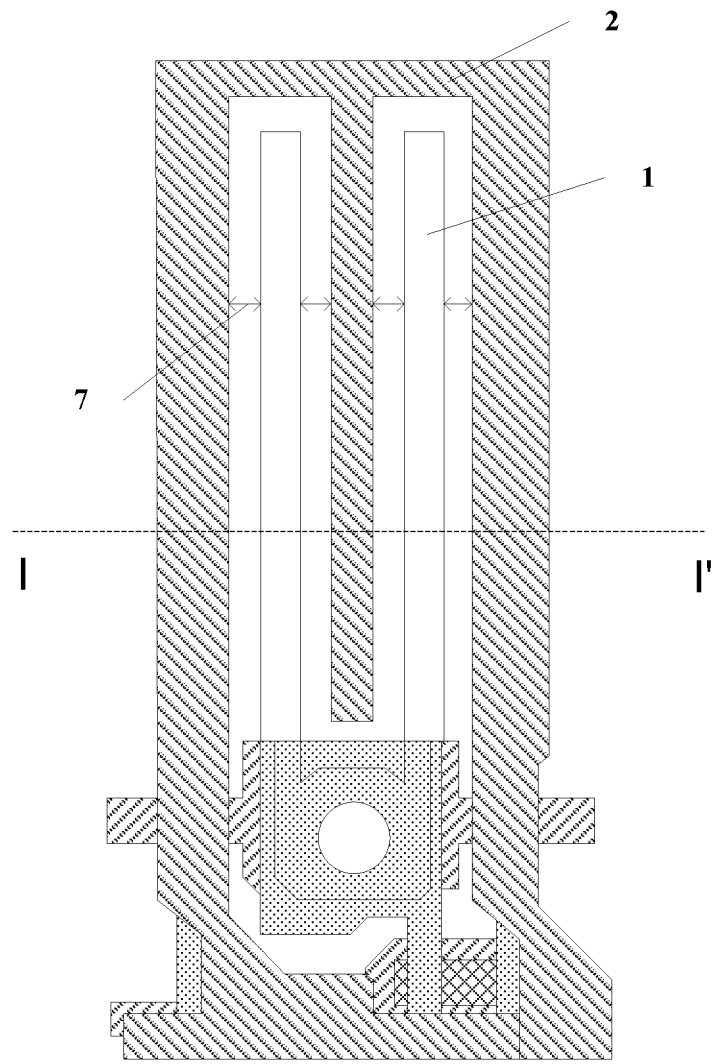
FIG. 1 is a plan view of an array substrate in the IPS mode.
Figure 2A:
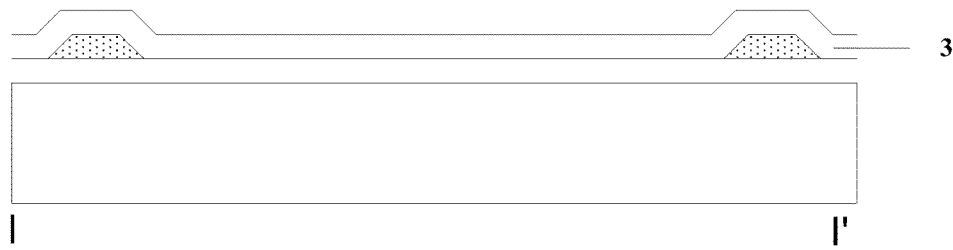
FIGS. 2a-2c are section views of an array substrate along the line I-I' in FIG. 1 in continuous manufacturing steps in the prior art.
Figure 2B:
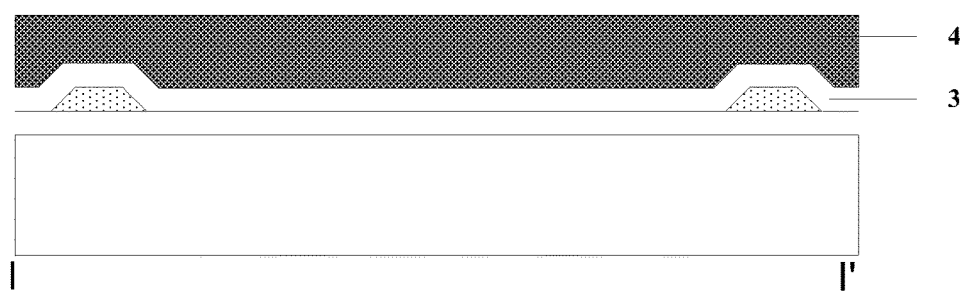
Figure 2C:
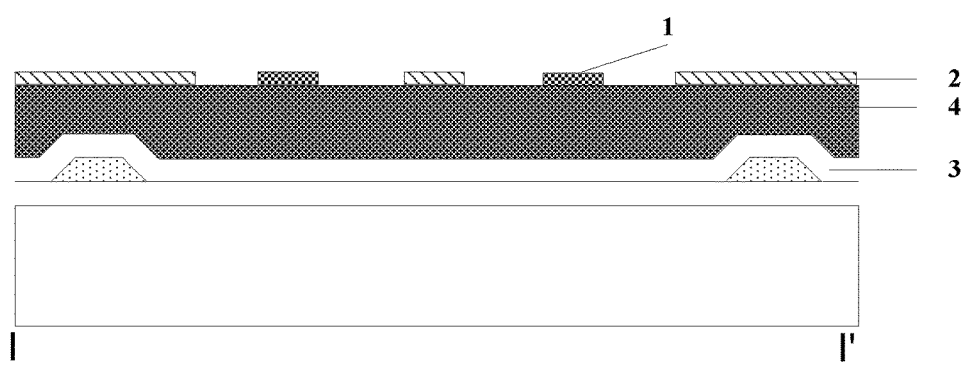
Figure 3A:
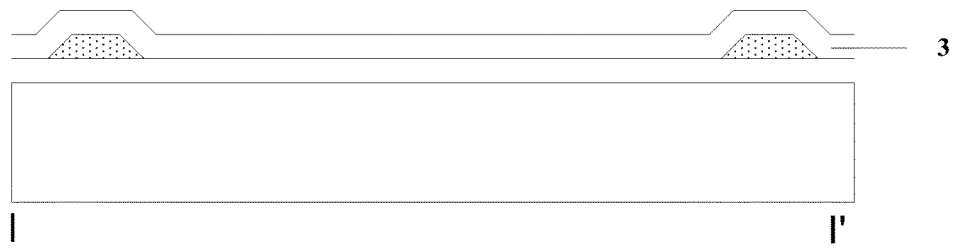
FIGS. 3a-3d are section views of an array substrate along the line I-I' in FIG. 1 in another series of continuous manufacturing steps in the prior art.
Figure 3B:
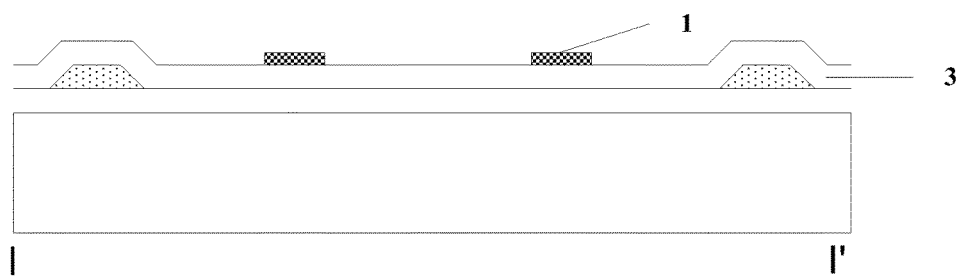
Figure 3C:
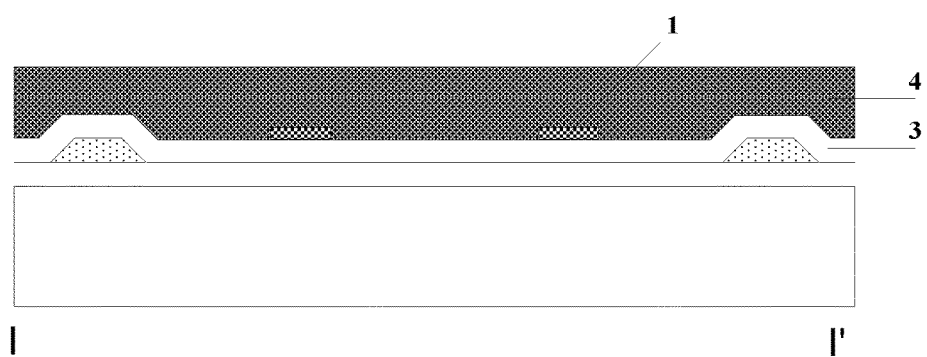
Figure 3D:
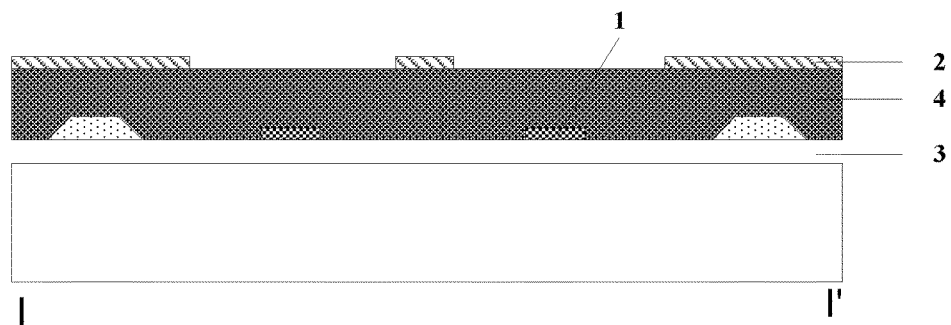
Figure 4:
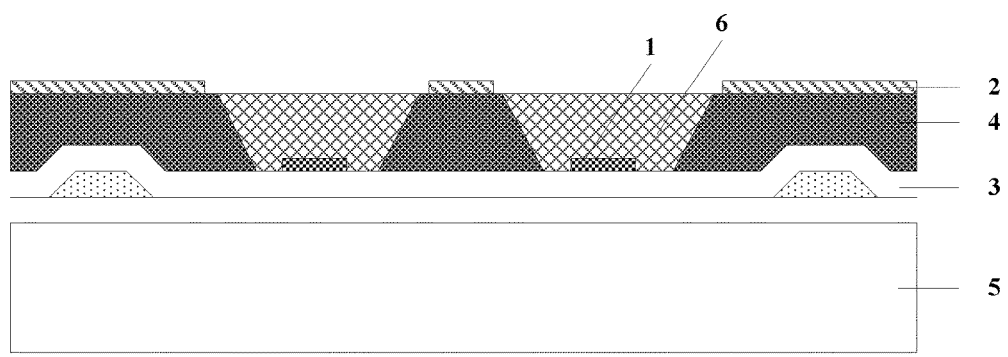
FIG. 4 is a schematic diagram of a cross-sectional view of an array substrate cut along the line I-I' in FIG. 1 according to an embodiment of the present invention.

FIG. 4 is a cross-sectional view of an array substrate cut along the line I-I' in FIG. 1 according to an embodiment of the present invention. Referring to FIG. 4, the array substrate comprises a substrate 5, a passivation layer 3 disposed on the surface of the substrate 5, a first organic film 4 disposed on the surface of the passivation layer 3 and provided with a groove where the passivation layer 3 is exposed at the bottom of the groove, a pixel electrode 1 disposed on the surface of the passivation layer 3 in the groove, a common electrode 2 disposed on the surface of the first organic film 4 outside the groove, and a second organic film 6 covering the pixel electrode 1.

Here a vertical projection of the common electrode 2 on the surface of the passivation layer 3 does not overlap with a vertical projection of the pixel electrode 1 on the surface of the passivation layer 3. Generally, the vertical projection of any common electrode 2 on the surface of the passivation layer 3 satisfies the following condition: the distance from the vertical projection of the pixel electrode 1 adjacent to the common electrode 2 on the surface of the passivation layer 3 should not be less than 2 µm.

It should be noted that both the thickness of the first organic film 4 and the thickness of the second organic film 6 are generally greater than or equal to 1 µm, and that the sum of the thickness of the second organic film 6 above the pixel electrode 1 and the thickness of the pixel electrode 1 is not greater than the thickness of the first organic film 4 below the common electrode 2, in accordance with some embodiments of the present invention.

Figure 5:
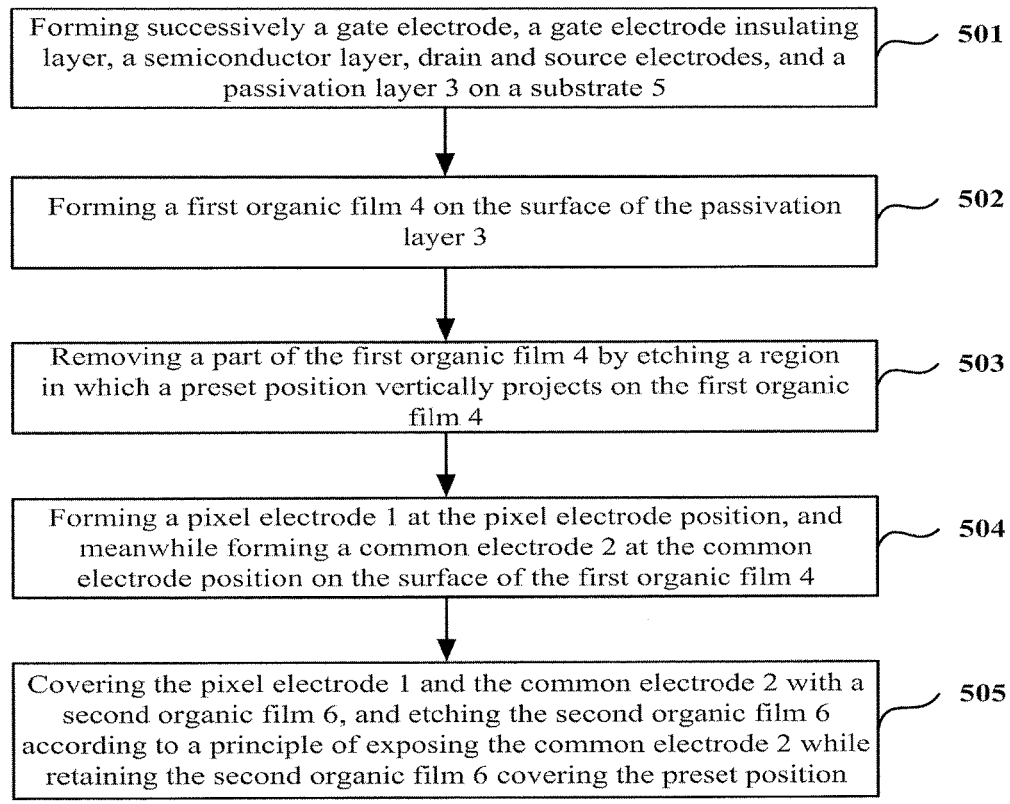
FIG. 5 is a flow schematic diagram of a manufacturing method of an array substrate according to an embodiment of the present invention.
Figure 6A:
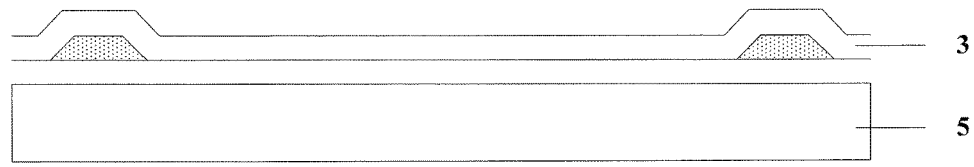
FIGS. 6a-6e are section views of an array substrate in continuous manufacturing steps according to an embodiment of the present invention.

FIG. 5 is a flow chart of a manufacturing method of an array substrate according to an embodiment of the present invention; and FIGS. 6a-6e are sectional views of the array substrate illustrating intermediate manufacturing steps. The method includes:

Step 501: forming successively a gate electrode, a gate electrode insulating layer, a semiconductor layer, drain and source electrodes (not shown in FIG. 6a) and a passivation layer 3 on a substrate 5, as shown in FIG. 6a.

Here this step is the same as the implementation process in the prior art, and will not be described herein in details.

Figure 6B:
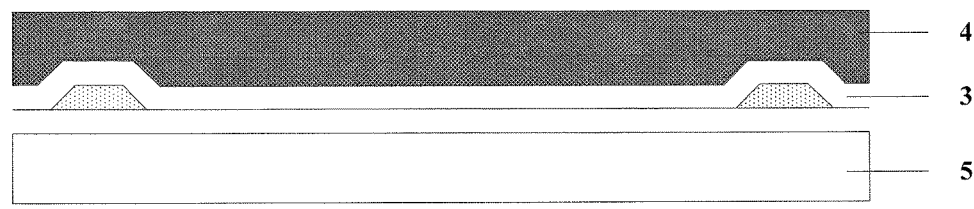

Step 502: forming a first organic film 4 on the surface of the passivation layer 3, as shown in FIG. 6b.

Step 503, removing a part of the first organic film 4 by etching a region in which a preset position vertically projects on the first organic film 4.

The preset position includes a pixel electrode position 9 and free of a region in which a common electrode position on the surface of the first organic film 4 vertically projects on the surface where the pixel electrode position 9 is located.

Figure 6C:
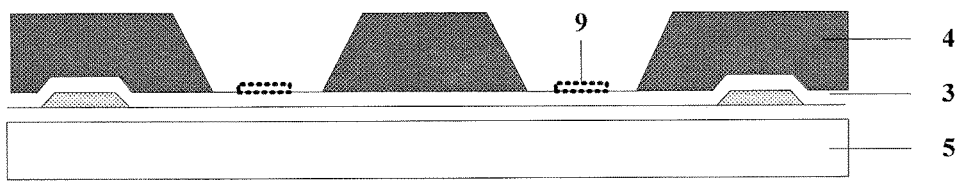

When the pixel electrode position 9 is disposed on the surface of the passivation layer, this step can be specifically as follows: etching the region in which the preset position vertically projects on the first organic film 4 until the passivation layer 3 is exposed in the region where the preset position is located, as shown in FIG. 6c.

Step 504: concurrently forming a pixel electrode 1 at the pixel electrode position 9, and forming a common electrode 2 at the common electrode position on the surface of the first organic film 4.

Figure 6D:
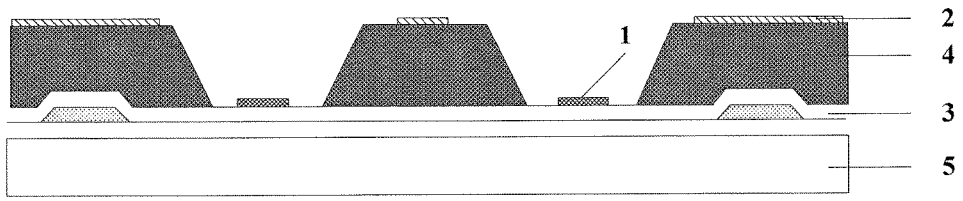

In an embodiment, the material of the pixel electrode 1 and the common electrode 2 can be indium tin oxide or indium zinc oxide, but not limited thereto in practical applications, as shown in FIG. 6d.

Figure 6E:
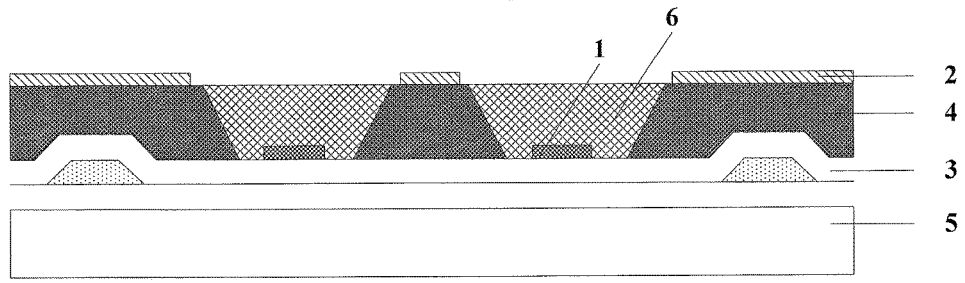

Step 505, covering the pixel electrode 1 and the common electrode 2 with a second organic film 6, and etching a part of the second organic film 6 to retain the second organic film 6 covering the preset position and expose the common electrode 2, as shown in FIG. 6e.

Specifically, when the second organic film 6 is etched, it should be ensured that the sum of the thickness of the pixel electrode 1 and the thickness of the second organic film 6 above the pixel electrode 1 is not greater than the thickness of the first organic film 4 below the common electrode 2.

In an embodiment of the present invention, the first organic film 4 is formed on the surface of the passivation layer 3 of the array substrate, a part of the first organic film 4 is removed by etching the region in which the preset position vertically projects on the first organic film 4, and finally the pixel electrode 1 is formed at the pixel electrode position 9 and the common electrode 2 is formed at the common electrode position on the surface of the first organic film, so that the pixel electrode 1 and the common electrode 2 cannot only be arranged on different planes of the same array substrate, but also formed at the same time, thereby ensuring high light transmittance of the array substrate and accurately controlling the specific gaps between the pixel electrode and the common electrode. Thus, the precision of overlapping of the pixel electrode and the common electrode with respective preset positions can be increased.

Figure 7:
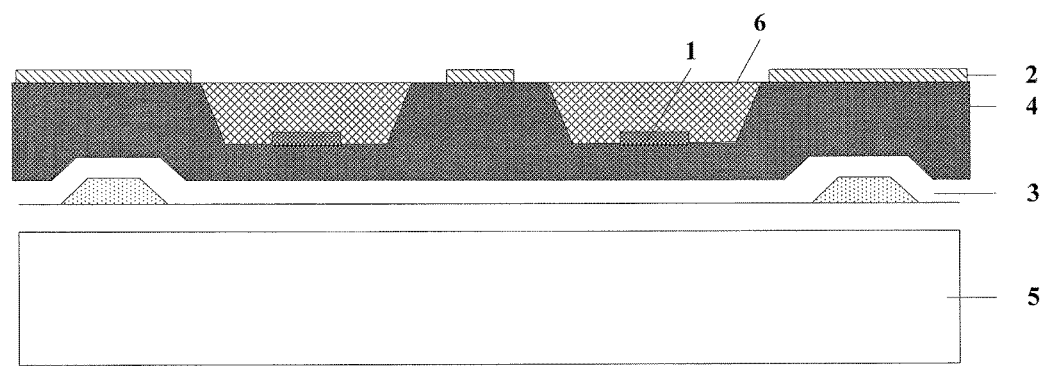
FIG. 7 is a schematic diagram of a section structure of another array substrate along the line I-I' in FIG. 1 according to an embodiment of the present invention.

As a variation of the above structure, an embodiment of the present invention provides an array substrate, as shown in FIG. 7, which is a schematic diagram of a section structure of the array substrate according to the embodiment of the present invention.

Referring to FIG. 7, the array substrate comprises a substrate 5, a passivation layer 3 disposed on the surface of the substrate 5, a first organic film 4 disposed on the surface of the passivation layer 3 and provided with a groove where the first organic film 4 is exposed at the bottom of the groove, a pixel electrode 1 disposed on the surface of the first organic film 4 in the groove, a common electrode 2 disposed on the surface of the first organic film outside the groove, and a second organic film 6 covering the pixel electrode 1.

Here a vertical projection of the common electrode 2 on the surface of the passivation layer 3 does not overlap with a vertical projection of the pixel electrode 1 on the surface of the passivation layer 3. The vertical projection of any common electrode 2 on the surface of the passivation layer 3 satisfies the following condition: the distance from the vertical projection of the pixel electrode 1 adjacent to the common electrode 2 on the surface of the passivation layer 3 should be not less than 2 μm.

It should be noted that both the thickness of the first organic film 4 and the thickness of the second organic film 6 are generally greater than or equal to 1 μm, and the sum of the thickness of the second organic film 6 above the pixel electrode 1, the thickness of the pixel electrode 1 and the thickness of the first organic film 4 below the pixel electrode 1 is not greater than the thickness of the first organic film 4 below the common electrode 2.

The manufacturing method of the array substrate described above is substantially the same as the step 501 to the step 505 descried above, and the difference lies in that when the array substrate in the embodiment is manufactured, in the step 503 of removing a part of the first organic film 4 by etching the region in which the preset position vertically projects on the first organic film 4, there is no need to expose a surface of the passivation layer 3 in the region where the preset position is located.

Furthermore, in the step 505 of etching the second organic film 6, in addition to the principle of exposing the common electrode 2 while retaining the second organic film 6 covering the preset position, a principle that the sum of the thickness of the pixel electrode 1, the thickness of the first organic film 4 below the pixel electrode 1 and the thickness of the second organic film 6 above the pixel electrode 1 is not greater than the thickness of the first organic film 4 below the common electrode 2 should also be abided by.

In the embodiment, the material of the pixel electrode 1 and the common electrode 2 can be indium tin oxide or indium zinc oxide, but not limited thereto in practical applications.

Figure 8A:
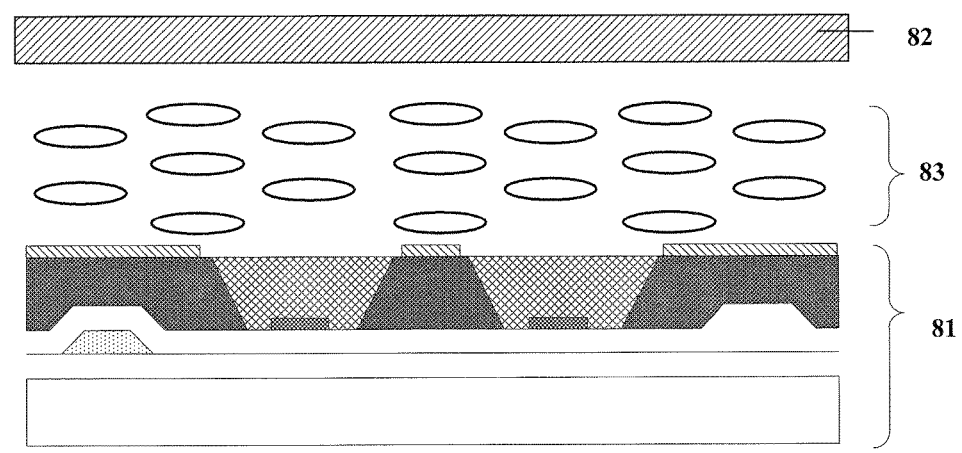
FIG. 8a is a schematic structure diagram of a liquid crystal display according to an embodiment of the present invention.

An embodiment of the present invention further provides a liquid crystal display, as shown in FIG. 8a, which is a schematic structure diagram of the liquid crystal display according to the embodiment of the present invention. The liquid crystal display comprises an array substrate 81 and a color film substrate 82 arranged to be opposite to the array substrate 81, with a liquid crystal layer 83 being formed between the array substrate 81 and the color film substrate 82, wherein the specific structure of the array substrate 81 is the same as the structure of the array substrate in FIG. 4, and thus it will not be repeated herein.

Figure 8B:
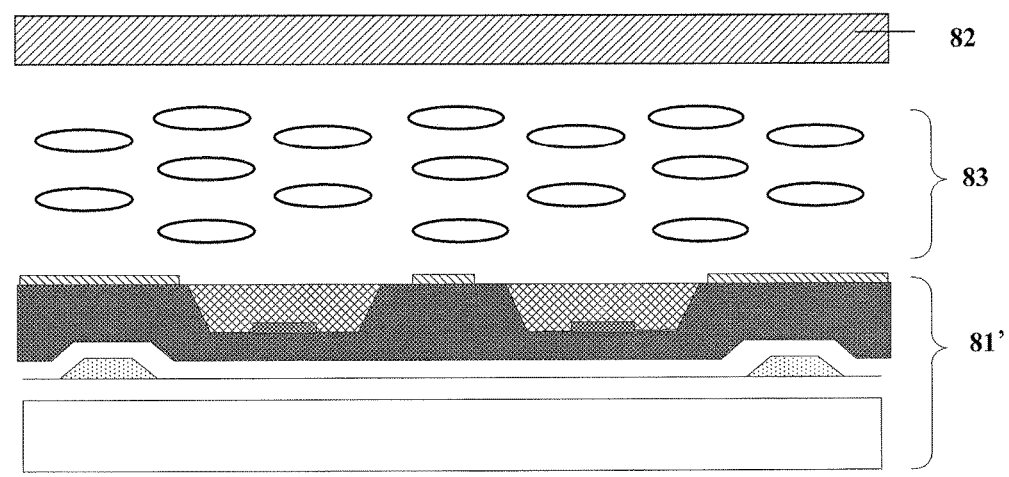
FIG. 8b is a schematic structure diagram of another liquid crystal display according to an embodiment of the present invention.

It should be noted that the array substrate in the liquid crystal display can also be as shown in FIG. 8b in practical applications, and the liquid crystal display comprises an array substrate 81' and a color film substrate 82 arranged to be opposite to the array substrate 81', with a liquid crystal layer 83 being formed between the array substrate 81' and the color film substrate 82, wherein the specific structure of the array substrate 81' is the same as the structure of the array substrate in FIG. 7, and thus it will not be repeated herein.

That is, the array substrate in the liquid crystal display according to the present invention is permissible as long as it can satisfy the structure of the array substrate described in any embodiment according to the present invention.

Although preferred embodiments of the invention have been described, those skilled in the art benefiting from the underlying inventive concept can make additional modifications and variations to these embodiments. Therefore, the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the appended claims and their equivalents.

What is claimed is:

1. An array substrate in an in-plane switching mode comprising:
   a substrate;
   a passivation layer disposed on a surface of the substrate;
   a first organic film disposed on the top surface of the passivation layer patterned into a plurality of grooves area and a plurality of lines area;
   a plurality of pixel electrodes disposed in the plurality of grooves area on the surface of the first organic film;
   a plurality of common electrodes disposed in the plurality of lines area on the surface of the first organic film; and
   a second organic film deposited on the first organic film, wherein the second organic film is patterned to cover the plurality of pixel electrodes and expose the plurality of common electrodes.

2. The array substrate according to claim 1, wherein the groove exposes a surface of the passivation layer; and
   a sum of a thickness of the second organic film disposed above the pixel electrode and a thickness of the pixel electrode is not greater than a thickness of the first organic film disposed below the common electrode.

3. The array substrate according to claim 1, wherein the groove exposes a surface of the passivation layer; and
a sum of a thickness of the second organic film disposed above the pixel electrode, a thickness of the pixel electrode and a thickness of the first organic film disposed below the pixel electrode is not greater than a thickness of the first organic film disposed below the common electrode.

4. The array substrate according to claim 1, wherein a thickness of the first organic film and a thickness of the second organic film each is greater than or equal to about 1 μm.

5. The array substrate according to claim 1, wherein the vertical projection of any of the common electrode on the surface of the passivation layer and the vertical projection of the pixel electrode of the passivation layer are separated from each other by a distance not less than about 2 μm.

6. A liquid crystal display comprising:
a array substrate in an in-plane switching mode;
a color film substrate arranged opposite to the array substrate; and
a liquid crystal layer between the array substrate and the color film substrate, wherein the array substrate comprises:
a substrate;
a passivation layer disposed on a surface of the substrate;
a first organic film disposed on the top surface of the passivation layer patterned into a plurality of grooves area and a plurality of lines area;
a plurality of pixel electrodes disposed in the plurality of grooves area on the surface of the first organic film;
a plurality of common electrodes disposed in the plurality of lines area on the surface of the first organic film; and
a second organic film deposited on the first organic film, wherein the second organic film is patterned to cover the plurality of pixel electrodes and expose the plurality of common electrodes.

7. A method of manufacturing an array substrate in an in-plane switching mode, the method comprising:
providing a substrate;
forming a passivation layer on the substrate;
forming a first organic film on a surface of the passivation layer;
patterening the first organic film into a groove area and a line area;
forming a pixel electrode in the groove area and a common electrode in the line area;
depositing a second organic film on the pixel electrode and the common electrode; and
patterning the second organic film to expose the common electrode.

8. The method according to claim 7, wherein patterning the first organic film further comprises:
exposing the surface of the passivation layer in the groove area of the first organic film.

9. The method according to claim 7,
wherein a sum of a thickness of the pixel electrode and a thickness of the second organic film disposed above the pixel electrode is not greater than a thickness of the first organic film disposed below the common electrode.

10. The method according to claim 7, wherein a bottom layer of the first organic film in the groove area remains to cover the passivation film.

11. The method according to claim 10, further comprising:
etching the second organic film, wherein a sum of a thickness of the pixel electrode, a thickness of the first organic film disposed below the pixel electrode and a thickness of the second organic film disposed above the pixel electrode is not greater than a thickness of the first organic film disposed below the common electrode.

* * * * *